United States Patent [19]

Burgbacher

[11] Patent Number: 5,047,682
[45] Date of Patent: Sep. 10, 1991

[54] PERMANENT MAGNET EXCITED ELECTRIC MOTOR

[75] Inventor: Martin Burgbacher, St. Georgen, Fed. Rep. of Germany

[73] Assignee: Papst-Motoren GmbH & Co. KG, St. Georgen, Fed. Rep. of Germany

[21] Appl. No.: 253,937

[22] Filed: Oct. 5, 1988

Related U.S. Application Data

[63] Continuation of Ser. No. 140,976, Jan. 6, 1988, abandoned, which is a continuation of Ser. No. 2,957, Jan. 12, 1987, abandoned.

[30] Foreign Application Priority Data

Jan. 13, 1986 [DE] Fed. Rep. of Germany ....... 3600737

[51] Int. Cl.⁵ .............................................. H02K 1/22
[52] U.S. Cl. .................................... 310/361; 310/154; 310/254
[58] Field of Search ............... 310/49, 49 R, 156, 154, 310/179, 180, 193, 216, 254, 258, 218, 259

[56] References Cited

U.S. PATENT DOCUMENTS

| | | | |
|---|---|---|---|
| 2,575,153 | 11/1951 | Wightman | 310/254 UX |
| 3,081,412 | 3/1963 | Granier | 310/254 X |
| 3,353,046 | 11/1967 | Papst | 310/216 X |
| 4,341,969 | 7/1982 | Sievert | 310/154 |
| 4,471,252 | 9/1984 | West | 310/154 X |
| 4,516,048 | 5/1985 | Brigham | 310/254 |
| 4,554,474 | 11/1985 | Morishita et al. | 310/154 |

*Primary Examiner*—Mark O. Budd
*Attorney, Agent, or Firm*—Fitch, Even, Tabin & Flannery

[57] ABSTRACT

A permanent magnet excited electric motor is provided with a low circumferential hump-like protrusion on the face of each electromagnetic pole to partially decrease the air gap between the stator and rotor and act as a so-called magnetic cam to exert a force on the rotor to smooth an otherwise uneven parasitic slot torque that occurs between the interaction of slot openings of the electromagnetic poles and the gaps between the permanent magnet poles.

22 Claims, 4 Drawing Sheets

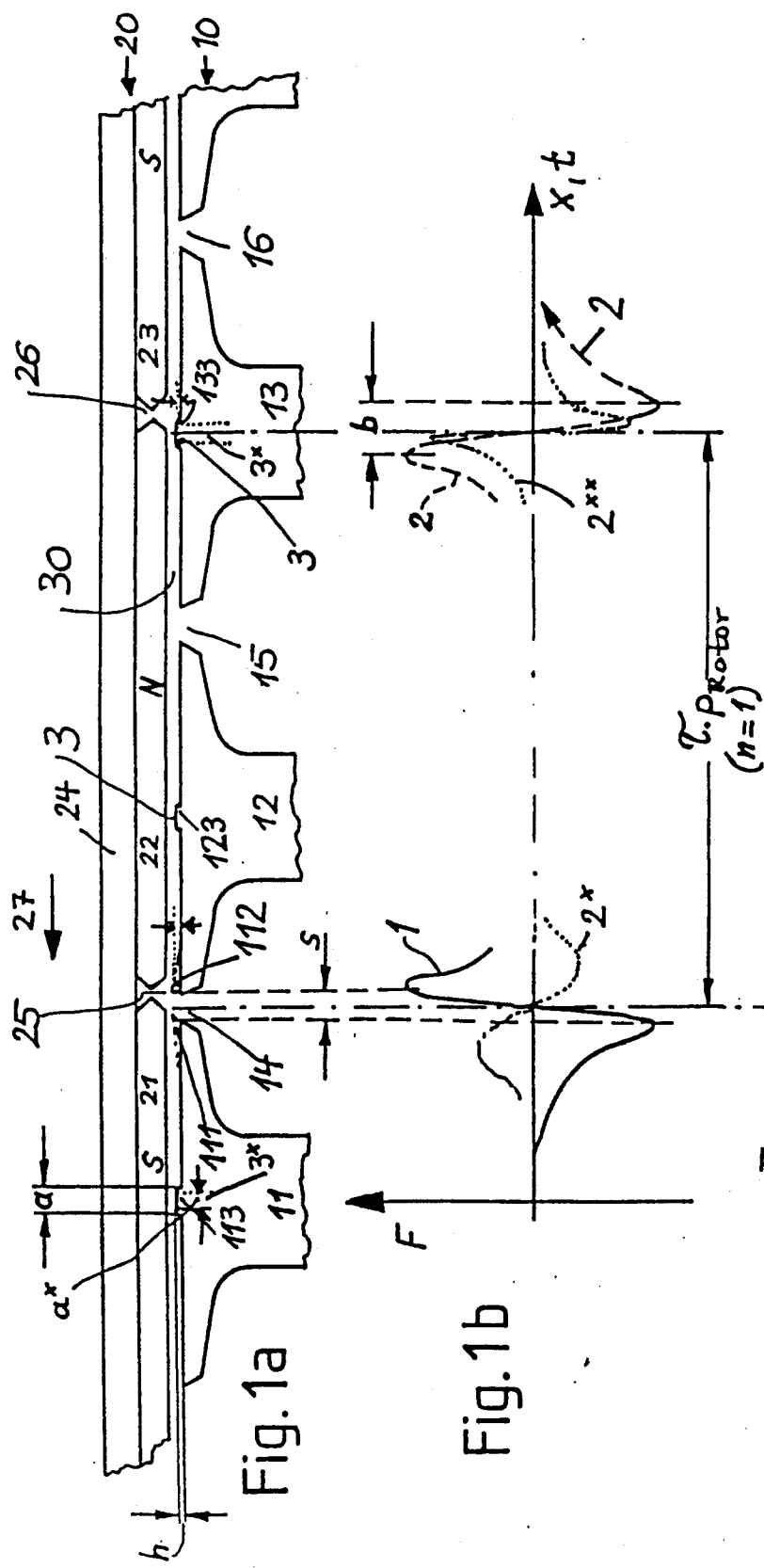
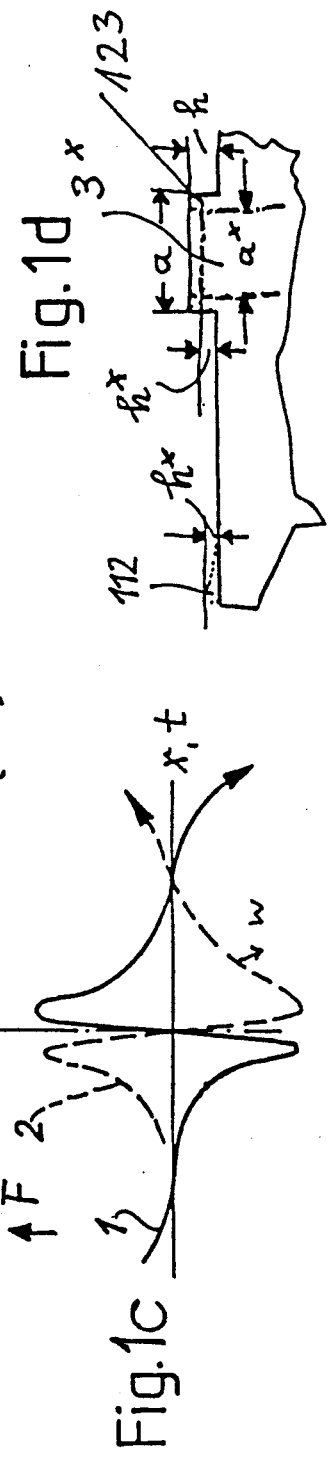
Fig.1a
Fig.1b
Fig.1c
Fig.1d

PERMANENT MAGNET EXCITED ELECTRIC MOTOR

This application is a continuation of application Ser. No. 140,976 filed Jan. 6, 1988, abandoned, which is a continuation of U.S. Ser. No. 002, 957, filed Jan. 13, 1987 abandoned.

An electromagnetic current generator excited by permanent magnets, provided with a slotted laminated core The present invention concerns an electromagnetic current generator excited by permanent magnets, which is provided with a slotted laminated core, such as a small brushless dc motor provided with permanent magnet rotor poles of relatively high inductance.

In so-called permanent magnet excited motors of this class (known in Germany by their acronym DEM), parasitic torque occurs on account of the mutual interference between the slots and the edges of the magnetized poles, which prevents smooth running of the motor. If the opening between the magnetized poles is made narrower, the parasitic uneven torque component or so-called slot torque unevenness will be somewhat greater.

If motors of this type are to be used in signal-processing devices where extreme compactness is required, the rotor must be provided with so-called rare earth magnets, which are particularly powerful permanent magnets. Such magnets may be made from a samarium and cobalt alloy. When a motor of this type is used in a hard disk unit with disk diameters of only 3½ or 5¼ in. and the motor must be installed inside the hard disk hub, whose outer diameter may be a mere 40 mm or even 25 mm, if relatively high performance is to be obtained from so restricted a space package, apart from a rare earth magnet to provide high air gap inductance, a multiphase coil must be used as well, although extreme miniaturization makes such devices difficult to manufacture. In a design with an external rotor, the essentially cylindrical air gap of relatively reduced size will generally be arranged radially outside the outer cylindrical surface of the stator.

The permanent magnet rotor is generally made of thin half or quarter shells, or rings which are narrow in the radial direction and are axially superimposed on one another. The radial narrowness of such rotor magnets results from the extremely limited diameter of the motor. In extremely small high output motors the air gap must be made as narrow as possible as well, whereby the term air gap is understood as the electrically effective mean distance between the iron surfaces of the stator and rotor. The combination of high inductance, a slotted stator and a minimum air gap thus gives rise to the extremely acute problem of reducing, or if possible, altogether preventing the occurrence of so-called parasitic slot torque unevenness in a motor intended to provide as constant torque as possible.

Furthermore, although trapezoidal magnetization of the permanent magnet rotor is associated with certain performance advantages, this method will accentuate the above problem, compared with sinusoidal magnetization.

A means of reducing the third harmonic of the torque pattern is taught in document DE-OS 28 23 208, whereby a certain periodicity is imparted to the stator air gap surface, so that the air gap varies periodically over the circumference of the stator.

The purpose of the present invention is to provide smooth running in motors of the aforesaid type, despite the presence of high field densities at the air gap. This purpose is implemented by the means described in claim 1.

The low peripheral hump-like protrusions according to the present invention serve to partially narrow the air gap above the stator pole and act, in a manner of speaking, as magnetic cams, whereby they exert forces on the rotor which can be used to smooth the torque. The generally somewhat rectangular cross section of these cams approaches the center, or even extends as far as the center of the stator poles in one significant embodiment of the present invention.

The present invention is preferably employed in motors of the aforesaid type provided with a cylindrical air gap and a slotted inner stator with a multiphase unoverlapped winding.

Further developments of the present invention and/or some advantageous embodiments thereof, will be derived from the subclaims.

The drawings are described as follows:

FIG. 1a shows a developed longitudinal section of the first embodiment of a motor according to the present invention, whereby the ratio of the number of stator poles to rotor poles may be 3:2 or 6:4, for instance.

FIG. 1b shows the corresponding patterns of parasitic slot torque unevenness 1 and useful torque unevenness 2 according to the present invention.

FIG. 1c shows combined curves 1 and 2.

FIG. 1d is an enlargement of a portion of FIG. 1a.

FIGS. 2a, 2b show an alternative and/or additional element whose effect is similar to that of the first embodiment according to FIG. 1a.

FIGS. 2a, 3a show the leading face in an axial direction and FIGS. 2b, 3b show a cross section of the aspect according to FIGS. 2a and/or 3a.

Figure 2A:
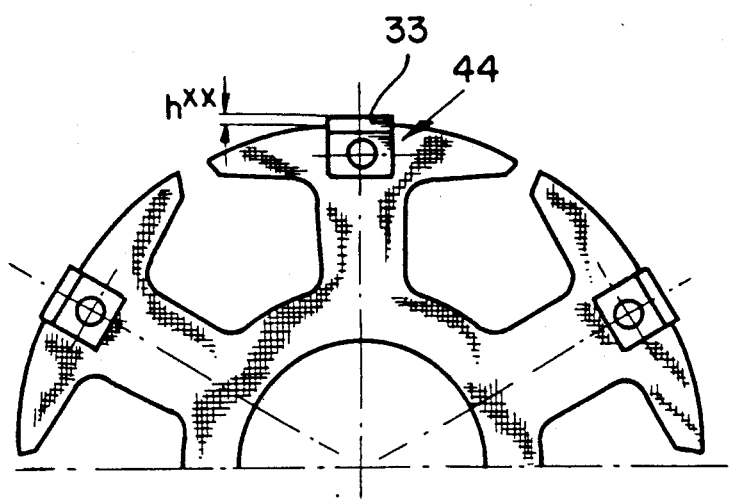

These drawings will now be described individually. FIG. 1 shows the partial development of a 6-pole stator provided with concentrated poles, 11, 12, 13 and a 4-pole rotor provided with permanent magnet poles 21, 22, 23, between which narrow circumferential pole gaps 25, 26 are arranged, wherein the width 's' of the stator slot openings 14, 15 corresponds to the distance between two stator pole ends, wherein furthermore the magnetic cams 3 (items 113, 123, 133), the extent of whose projection is labeled 'a', are arranged concentrically at the center of each stator pole, wherein the height of these cams is labeled 'h'. Between the stator 10 and the rotor 20, the air gap is found, which is defined by the stator pole heads and the permanent magnets 21, 22 and 23 of the rotor. The four rotor poles 21 et seq are surrounded by a soft magnetic return circuit layer 24. During motor rotation, i.e. when the rotor moves in the direction of the arrow 27, uneven parasitic slot torque arises as a result of the interaction between the stator slot opening 14 and the rotor pole gap 25, resulting in the uneven torque curve 1 shown in FIG. 1b. At the same time, over a distance corresponding to the rotor/-pole pitch $T_p$ rotor, as result of the interaction between the magnetic cam 133 and the rotor pole gap 26, uneven counterphased torque occurs adjacent to the rotor pole gap 26 according to the curve 2. FIG. 1c shows the compounded curves 1 and 2. Parasitic slot torque arises whenever the end of a high inductance permanent magnet, such as the magnet 21, adjacent to the pole gap 25, travels from the stator pole 11 past the open slot 14 above the adjacent stator pole 12. This has been confirmed by measurement which has shown that whenever the edge of the slot 14, for instance, is located between poles, such as poles 21,22 for example, maximum torque unevenness arises, as can be seen from the curve pattern 1 according to FIG. 1b. Consequently, the distance between the peaks of curve 1 corresponds to the width 's' of the slot openings, such as 14, for instance.

In order to make the distance b between the compensation torque peaks (curve 2) provided by the cams 3 according to the present invention coincide with this distance 's', it is important to optimize the cam width a to this end. This is because at b=s the parasitic torque curve 1 will be fully compensated by the curve 2. This optimal cam width lies in the range n=0.5 ... 1xs but it will be influenced by the inductance pattern in the permanent magnet.

It has thus been demonstrated that uneven torque can also be generated by the presence of narrow air gap constrictions above a stator pole in the circumferential direction, whose pattern can be made to almost coincide with that of the slot openings (cf. curve 1), by suitable positioning and sizing of the so-called magnetic cams 3. If these cams are arranged so that the average distance between them and the corresponding slot gap equals one pole pitch of the rotor (p) or a whole-number multiple thereof, the uneven torque pattern provided by these cams will be the exact reverse of the slot torque, i.e. slot torque unevenness will be compensated (cf. curve 2).

The circumferential width a of this cam, that is to say its extent in 'a' circumferential direction, may not amount to more than a minute fraction of the stator pole pitch. An optimal relationship exists between the circumferential width of the cam 'a' and the width 's' of the slot gap between the aforesaid stator poles or salients, so that even an extremely narrow cam width 8, accompanied, under certain circumstances, by simultaneous widening of the slot, may produce the same ratios, which is advantageous for the coil winding process.

In particular, in the case of a 3-phase winding with 4 rotor poles for a six-slot motor of the type described in disclosure document DE-OS 31 22 049, the invention has been shown to be capable of achieving an outstanding reduction of undesirable slot torque unevenness.

On the basis of the results of optimization testing, it was observed that a further improvement could be obtained by narrowing the air gap towards the ends of the stator hammer heads by the provision of radial protrusions, in the form of pointed tips at the ends of the stator poles, as described in disclosure documents DE-OS 29 19 581 or 30 49 494 in connection with so-called reluctance torque motors.

Figure 5:
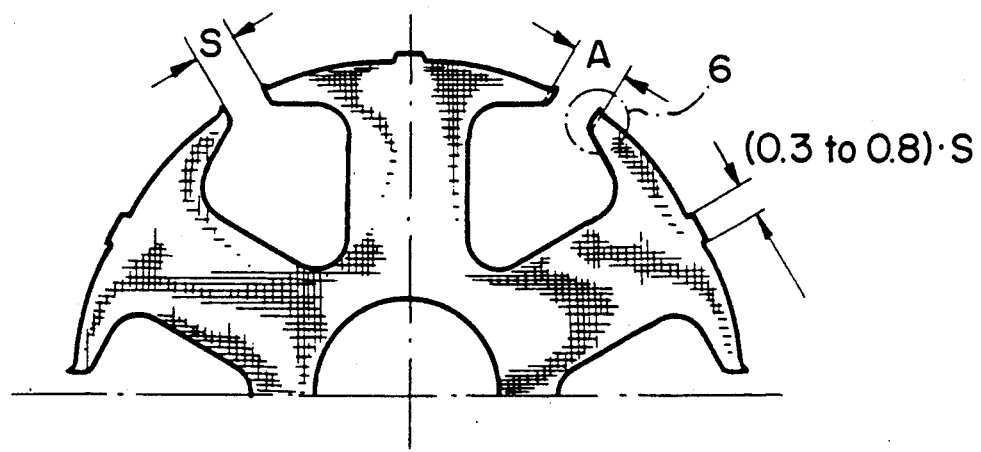
FIG. 5 shows a second embodiment provided with pointed pole ends in a radial direction.

Providing the hammer heads with pointed ends (6) according to FIG. 5 has a similar effect to the presence of the cams. However, because the distance 'A' will always exceed the width of the slot opening 's', the amplitude of its curve $2^x$ will always be less and its position will be displaced away from the center of the slot. As a result, a relatively large harmonic will be produced, and consequently in an optimal arrangement these pointed tips will always be combined with an even narrower cam, where $a^x = 0.3 \times 5$ to $0.8 \times 5$. It was surprising to find that the same ratios prevail if the cam height is reduced to $h^x = 0.05-0.2$ mm, which allows a further favorable reduction of the average air gap width.

This is shown in FIGS. 1a, 1b, whereby the second solution corresponding to claim 6 is shown by lines or dashes and dots and dotted lines. The compensatory effect of the superimposed pointed tips 111, 112 corresponds to the curve $2^x$, and the effect of the peripherally narrower cam $3^x$ corresponds to the curve $2^{xx}$ (cf. curve 1b). Both of these effects occur as part of the overall effect at the same time as the curve 2, but this result is obtained at a lower value of $h^x$, so that the average air gap is narrower and increased motor output is obtained. This surprising development is all the more welcome, since a certain allowance for manufacturing tolerances must be made in motor construction, in addition to the theoretical minimum air gap, and in sizing the air gaps in motors of this small size every tenth of a millimeter is significant.

Figure 4:
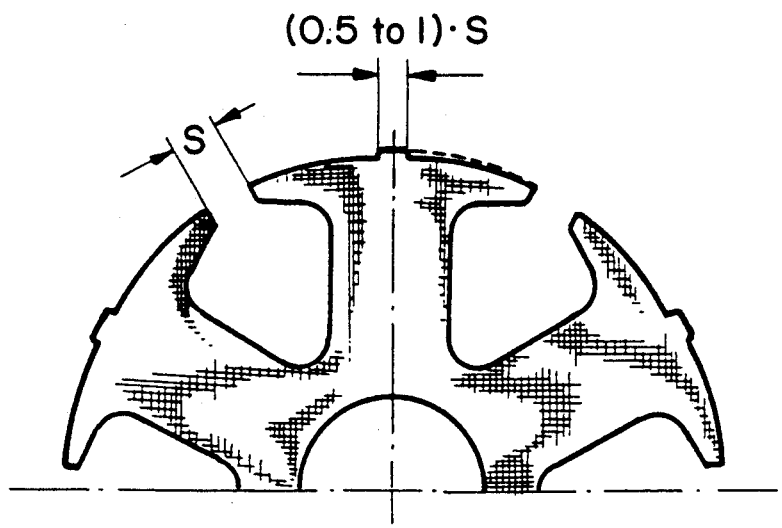
FIG. 4 shows essentially a view of the first embodiment according to FIG. 1a, enlarged approximately 4 times life-size, whereby the air gap again narrows towards the stator pole end until it corresponds to the cylindrical enveloping surface, which also surrounds the raised protrusions according to the present invention.

The cam height 'h' defines the peak amplitude. This is implanted within the usual range of air gap widths of 0.3–0.6 mm, as h=0.1–0.3 mm high range in the design of a motor according to the present invention (see FIG. 4). In order to make the average air gap expansion resulting from the presence of the cams as small as possible, it is furthermore proposed that the diameter in the direction of the slot opening be increased progressively towards the cam height.

In an alternative or possibly additional arrangement, a cam effect can be obtained in the slot opening area by magnetically sealing the area by means of ferromagnetic slot parts, as taught in document DE-AS 11 94 043.

It would basically appear possible to use the present invention in connection with slotted rotor cores, as well. If these rotor cores rotate in the magnetic field of the permanent stator magnets, enhanced smooth running can be obtained in this area as well, according to the present invention. This variant however implies the need to provide mechanical brushes. Reduced slot torque unevenness can be useful in motors of this type to provide enhanced running characteristics for special applications.

Figure 2B:
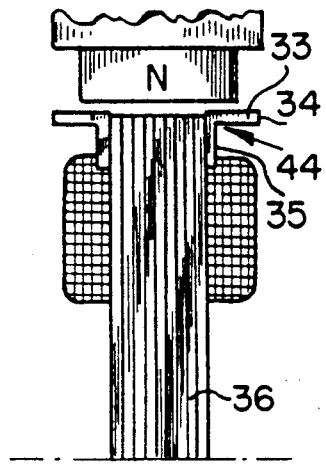

FIG. 2a shows ferromagnetic brackets 33 riveted to the stator cores, whose branches 34 in an axial direction project beyond the core package 36, so as to narrow the air gap between the cores and the outer rotor magnet N. For this reason, these axial branches 34 of the brackets 33 have the same effect at the pole center as the magnetic cams according to the present invention. This solution is certainly a compromise whose overall significance lies in that it provides a relatively wide effective air gap between the rotor and the stator (N, 36). However, no special stamping tool is required for the manufacture of the core laminations 36. The aforesaid brackets are provided in an axial direction on both sides of the face of the stator core package, as shown in FIG. 2b. In combination with the brackets 33 which project over the stator laminations in an axial direction, and in particular the axial branches of these brackets, the rotor magnet which projects in an axial direction provides an effective and low cost application of the present invention and a possible enhancement of the effectiveness of the arrangement according to FIG. 1.

Figure 3A:
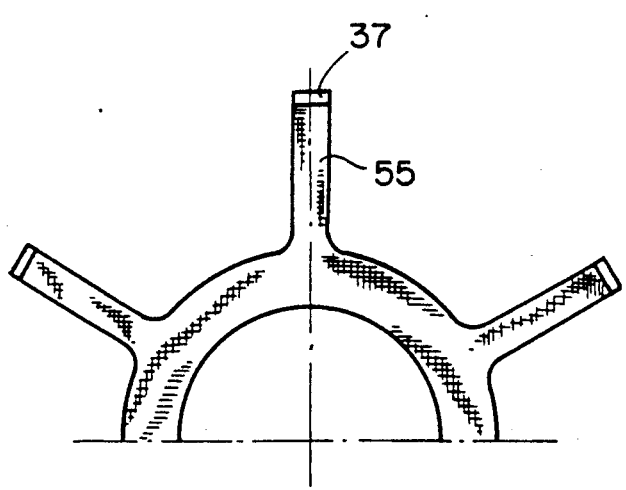
FIGS. 3a, 3b show an alternative solution to that shown in FIGS. 2a and 2b, which is easier to manufacture, whereby
Figure 3B:
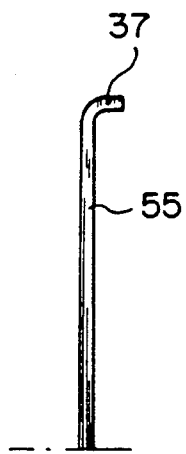

FIGS. 3a, 3b show a way of substituting the brackets 34 by angled tab inserts 37 provided with projecting axial collars.

Figure 6A:
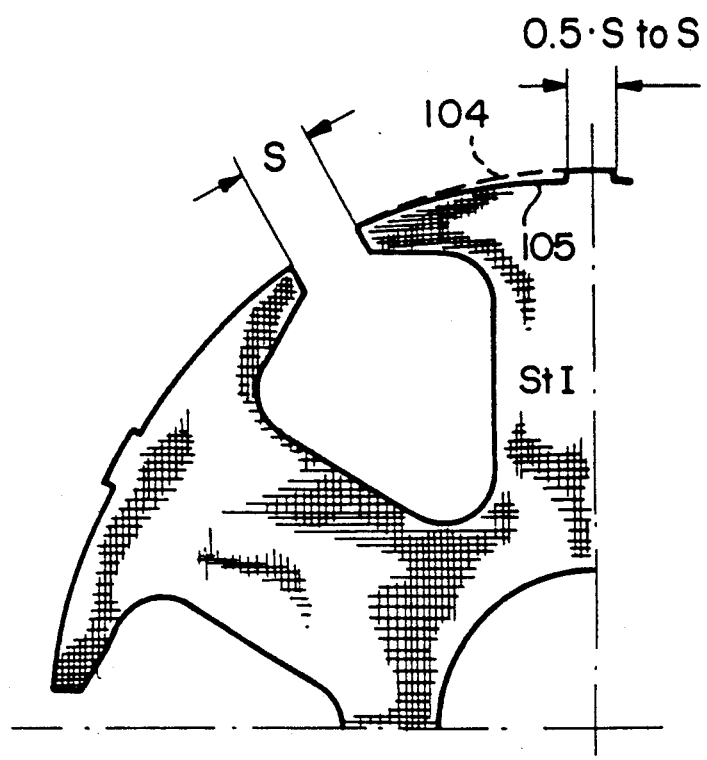
FIGS. 6a, 6b show an enlarged view of the stator configuration according to FIGS. 4 and 5.
Figure 6B:
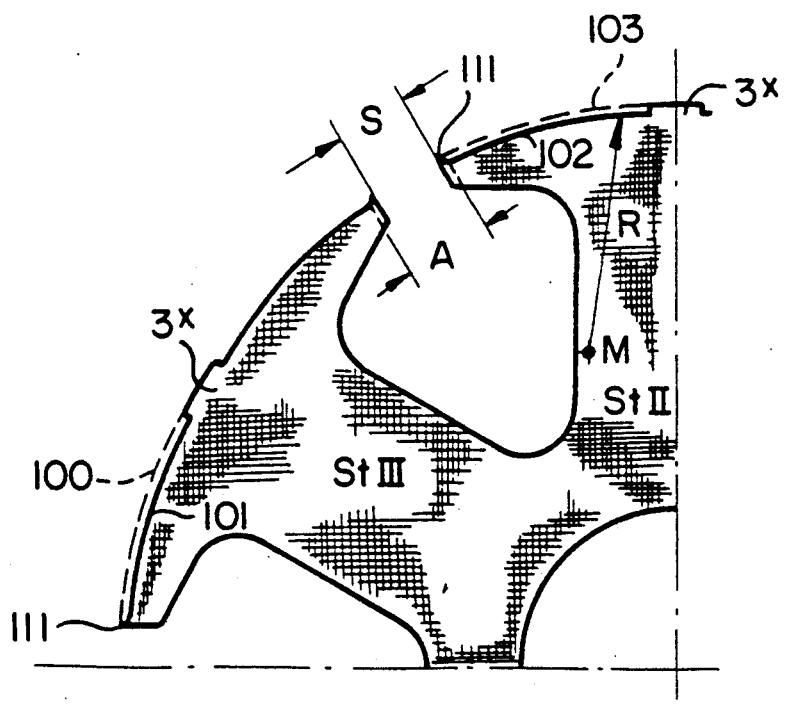

In FIG. 5 a narrowing of the air gap towards the stator pole ends indicated by lines of dots and dashes, is provided so that the corresponding torque peaks (curves $2^x$) are further apart than the width of the slot opening 's', corresponding to the distance A. This effect was described in connection with FIG. 1. Adjacent the area about the center point between the stator pole midpoint and any stator pole end, a circular cylindrical protrusion 102, 105 is provided beyond the cylindrical envelope surface 103, starting at the recess near the cam 3x and extending to the recess near the tip 111 of the stator pole end, so that the average air gap diameter is effectively reduced (cf. FIG. 6b in connection with the stator pole ST II). The radius of curvature 'R' of this protrusion 102, 105 is substantially less than that of the envelope surface 103, 100, 104.

I claim:

1. An electromagnetic direct current motor excited by permanent magnets comprising
   a laminated core having radially extending slots with slot openings at a coaxial surface of the core, the coaxial surface being cylindrical;
   at least one winding forming electromagnetic poles defined in sectors between the slots,
   a plurality of radially thin, annular permanent magnets arranged in alternating polarities in the general form of a ring with a gap separating each polarity, the faces of the electromagnetic poles facing the faces of the permanent magnets and being separated by an air gap defined therebetween, one of the electromagnetic poles as an entity or the permanent magnets as an entity being the stator and the other the rotor;
   no more than one raised portion on each of the electromagnetic pole surfaces extending radially into the air gap, the circumferential width of the raised portion being small compared to the electromagnetic pole pitch such that the electromagnetic pole pitch is many times the circumferential width of the raised portion; and
   the raised portions being located circumferentially on the surface of the laminated core such that the distance measured in the direction of rotor rotation from the center of a core slot defined between any given pair of electromagnetic poles to the center of a raised portion on the electromagnetic pole adjacent the given pair is equal to n times the permanent magnet pole pitch, n being a whole number.

2. An electromagnetic direct current motor according to claim 1, wherein the motor is a small brushless dc motor and wherein the stator includes the laminated core and electromagnetic poles and the rotor includes the permanent magnet poles, the rotor poles being of relatively high inductance.

3. A motor according to claim 2, wherein the raised portions are provided at the stator pole centers, and wherein the ratio of the number of stator poles to rotor poles is 3:2.

4. A motor according to claim 3, wherein the circumferential extent of the raised portion corresponds to from 0.5 to 1 times the width of the stator slot opening.

5. A motor according to any one of claims 2-4, wherein the air gap is maximally wide immediately adjacent the raised portions, the width of the air gap decreasing to the value above the raised portion as the air gap approaches the stator pole tips.

6. A motor according to claim 5, wherein at an effective air gap of from 0.3 to 0.6 mm, the height of the raised portion is from 0.1 to 0.3 mm.

7. A motor according to claim 5, wherein the electromagnetic pole faces are pointed in a radial direction towards the air gap and wherein the circumferential extent of the raised portion corresponds to from 0.3 to 0.8 times the width of the stator slot opening.

8. A motor according to claim 7, wherein the height of the raised portion is approximately from 0.05 to 0.15 mm at an effective air gap width of from 0.3 to 0.6 mm.

9. A motor according to claim 8, wherein the width of the air gap decreases progressively from immediately adjacent the raised portion circumferentially toward an adjacent slot opening.

10. A motor according to claim 8, wherein the width of the air gap decreases in steps from immediately adjacent the raised portion circumferentially toward an adjacent slot opening.

11. A motor according to claim 3, wherein the stator winding provided with a cylindrical air gap is multiphased.

12. A motor according to claim 11, wherein the stator winding is wound without overlap.

13. A motor according to claim 2, wherein the pattern of magnetization of the rotor in the circumferential direction is distributed in a trapezoidal shape.

14. A motor according to claim 13, wherein the rotor magnet is a rare earth magnet.

15. A motor according to claim 12, wherein the stator is a three-phase stator.

16. A motor according to claim 15, wherein the motor is provided with 6 stator poles and 4 rotor poles.

17. A motor according to claim 9, wherein adjacent the raised portion, the air gap width immediately decreases sharply, then increases and finally decreases again as it approaches the stator pole tips.

18. A motor according to claim 6 having an outside diameter of approximately 40 mm.

19. A motor according to claim 6 having an outside diameter of approximately 25 mm.

20. A motor according to claim 10 wherein adjacent the raised portion, the air gap immediately decreases sharply, then increases and finally decreases again as it approaches the stator pole tips.

21. A motor according to claim 8 having an outside diameter of approximately 40 mm.

22. A motor according to claim 8 having an outside diameter of approximately 25 mm.

* * * * *

UNITED STATES PATENT AND TRADEMARK OFFICE
CERTIFICATE OF CORRECTION

PATENT NO. : 5,047,682

DATED : September 10, 1991

INVENTOR(S) : Martin BURGBACHER

It is certified that error appears in the above-identified patent and that said Letters Patent is hereby corrected as shown below:

```
Column 1, line 7, change "002, 957" to --002,957--.
Column 1, line 8, after "1987" insert a comma.
Column 1, lines 13-14, change ", which is" to --and--.
Column 2, lines 3-5, delete "This purpose is implemented by the
     means described in Claim 1."
Column 2, lines 19-21, delete the paragraph, "Further develop-
     ments of the present invention and/or some advantageous
     embodiments thereof, will be derived from the subclaims."
Column 3, line 22, change "b" to --'b'--.
Column 3, line 25, change "a" to --'a'--.
Column 3, line 45, change "a" to --'a'--.
Column 3, line 46, change "'a'" to --a--.
Column 3, line 51, delete "8".
Column 4, line 10, change "0.3x5 to 0.8x5" to --0.3xs to
     0.8xs--.
Column 4, line 32, change "implanted" to --implemented--.
Column 4, line 33, delete "range".
```

Signed and Sealed this

Twenty-second Day of December, 1992

*Attest:*

DOUGLAS B. COMER

*Attesting Officer*    Acting Commissioner of Patents and Trademarks